May 12, 1953　　　　J. H. PROWINSKY ET AL　　　　2,638,236
HAND TRUCK
Filed Nov. 22, 1950　　　　　　　　　　　　　　　　4 Sheets-Sheet 1
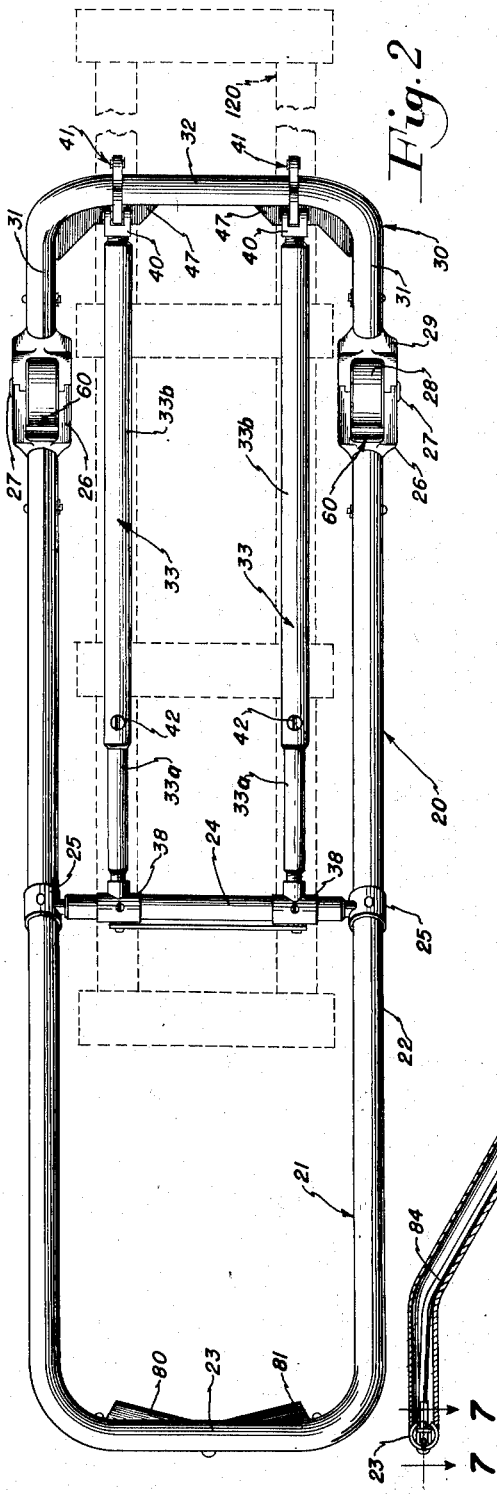
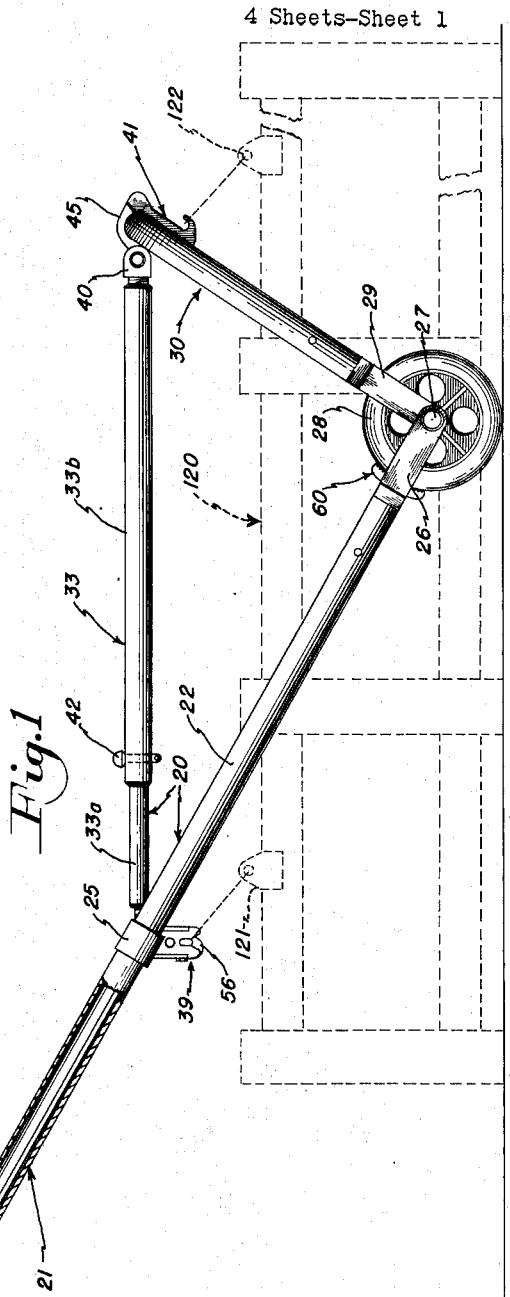
INVENTORS
**JOSEPH H. PROWINSKY
DAVID J. CARLSON**
BY
ATTORNEYS May 12, 1953   J. H. PROWINSKY ET AL   2,638,236
HAND TRUCK
Filed Nov. 22, 1950   4 Sheets-Sheet 2
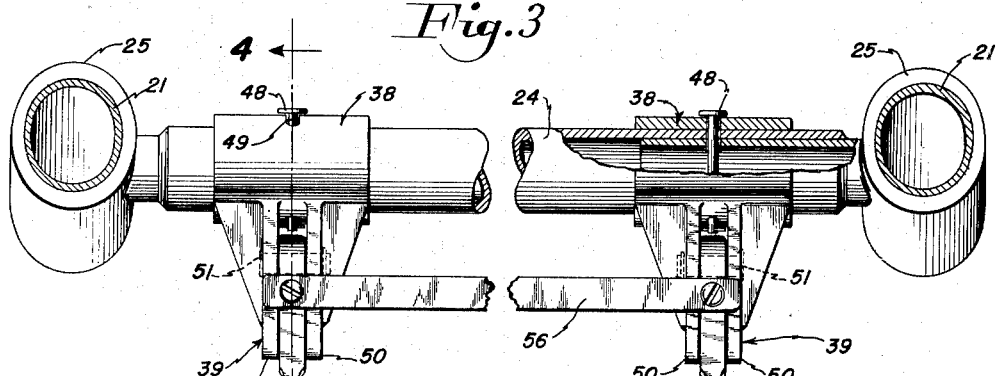
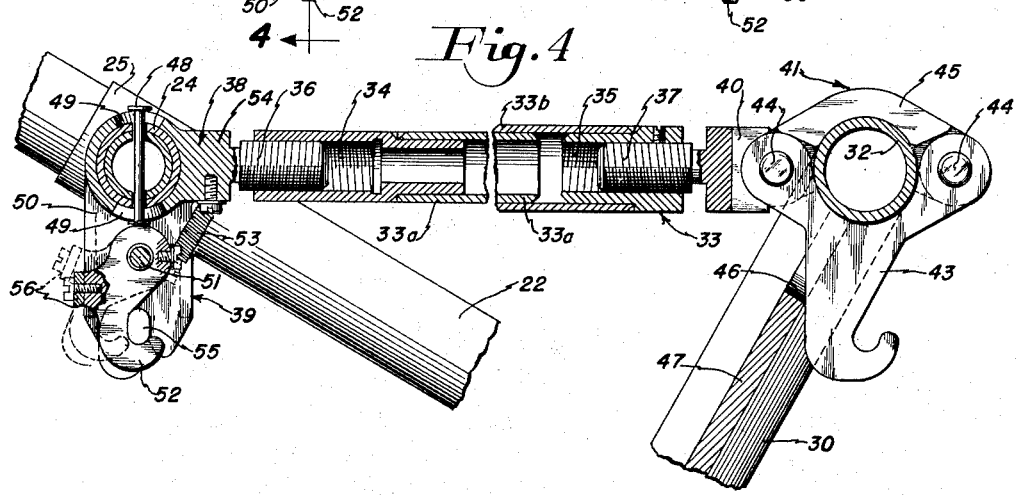
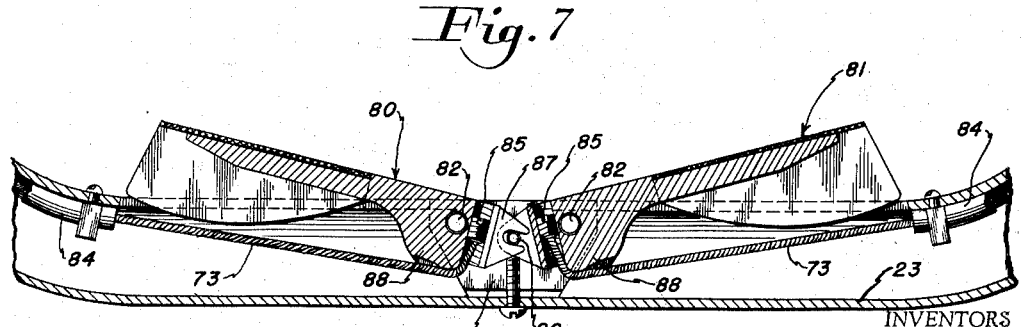
INVENTORS
JOSEPH H. PROWINSKY
DAVID J. CARLSON
BY
ATTORNEYS

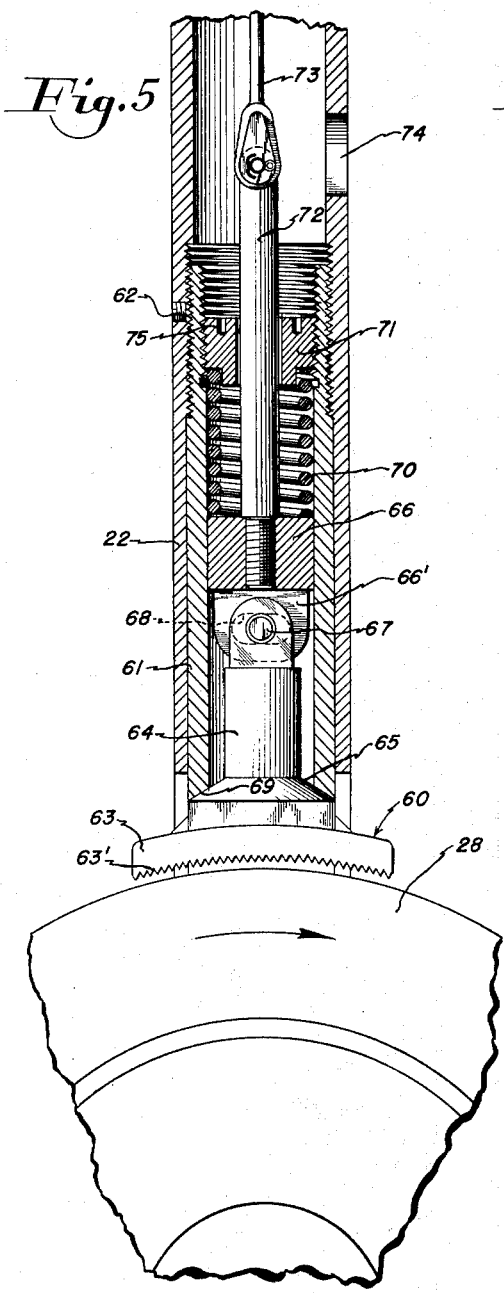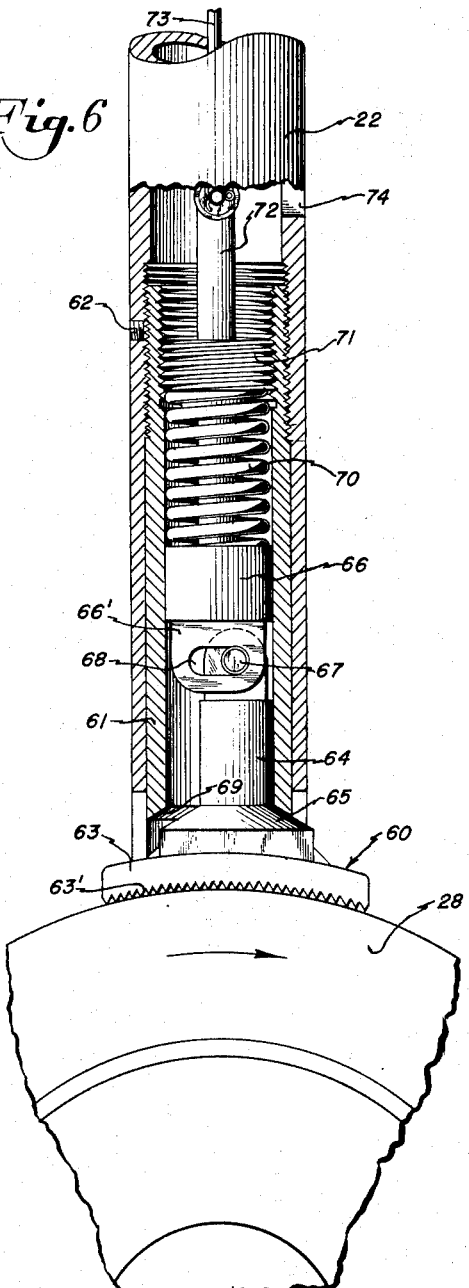

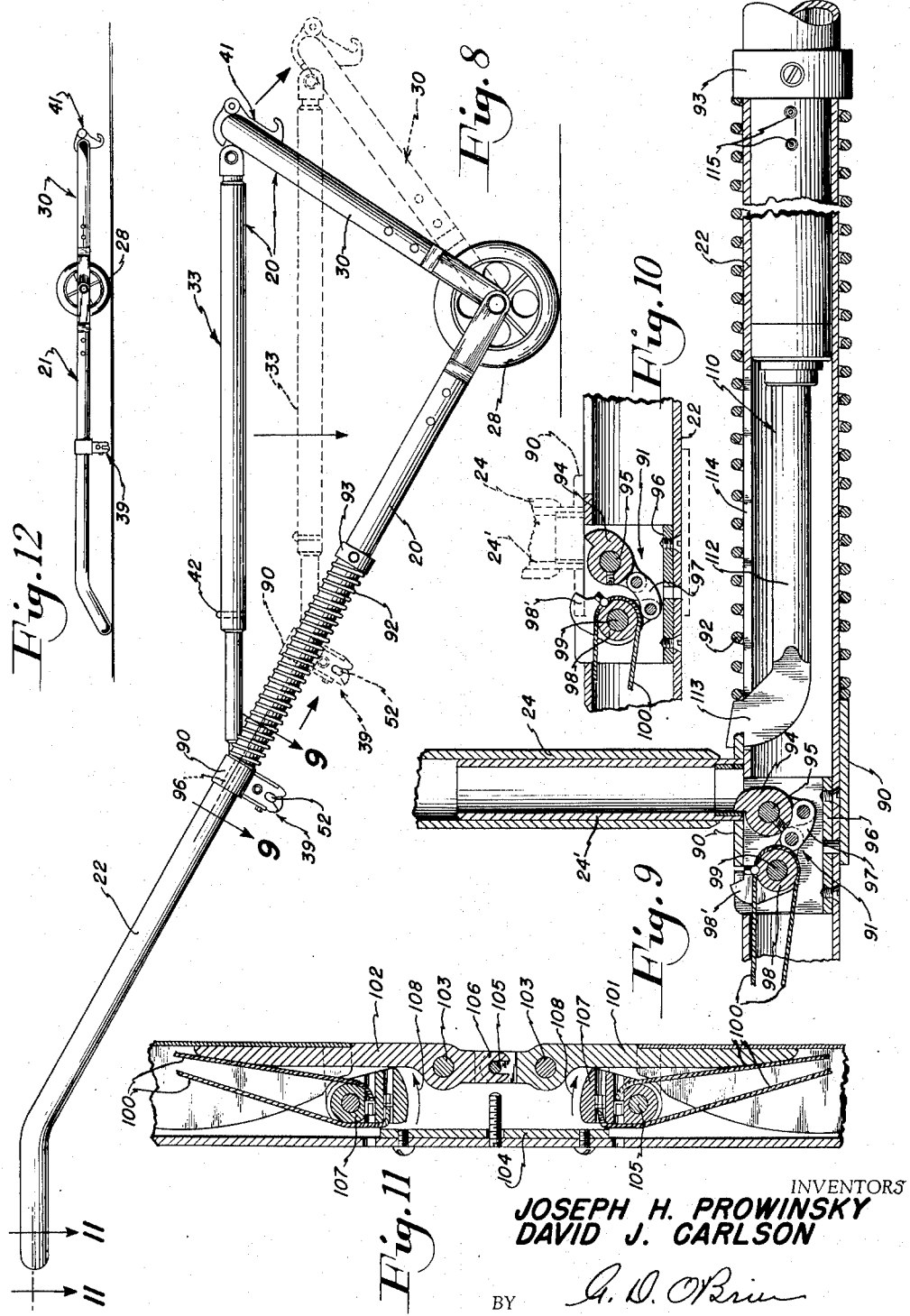

Patented May 12, 1953

2,638,236

UNITED STATES PATENT OFFICE 2,638,236

HAND TRUCK

Joseph H. Prowinsky, Washington, D. C., and
David J. Carlson, Vienna, Va.

Application November 22, 1950, Serial No. 197,148

11 Claims. (Cl. 214—373)

(Granted under Title 35, U. S. Code (1952),
sec. 266)

This invention relates to hand trucks and more particularly to a hand truck which enables a single man to pick up a relatively heavy load, to move it with ease and safety from place to place, and to deposit it without the aid of any auxiliary equipment such as hoists, chain falls, pallets, or the like.

Heretofore hand trucks for transporting heavy loads weighing up to a thousand pounds have usually been of either the closed bed type or the hydraulic lift type. The closed bed type, of course, requires some hoisting means, usually separate from the truck for loading and unloading the articles. Because much extra equipment and the services of several handlers are required, this type of truck is slow in operation and is inefficient for moving a large quantity of articles. The hydraulic truck usually comprises a platform capable of being vertically raised beneath an article which must be spaced from the ground on a suitable platform or pallet. While this type enables a single man to handle heavy loads without aid, it is expensive and usually requires that the load remain on its pallet if it is to be frequently moved, thereby wasting valuable storage space. Furthermore, because of space limitations the conventional hydraulic lift truck is unsuited for moving elongated narrow objects such as rockets, tanks, piping or the like, which must frequently be moved in the direction of their longitudinal axis.

The present invention contemplates overcoming these and other disadvantages by providing a light, two-wheeled truck of frame construction which is adapted to straddle an object and engage suitable lugs thereon with hooks depending from the truck frame. The wheels of the truck serve as a fulcrum for an elongated handle portion which provides an operator with sufficient leverage to enable him to lift the article when the hooks are engaged therewith. An improved brake is provided for stopping the truck and the load may be set down by manipulating the handle or by providing means for partially collapsing the truck frame. The truck frame may be completely collapsed to enable ready storage thereof.

One object, therefore, of the present invention is to provide a hand truck of the above type which enables a single man to pick up, move, and set down again articles weighing up to a thousand pounds without the use of auxiliary equipment or the aid of manhandlers.

Another object of the present invention is to provide a two-wheeled truck of the straddle type which is particularly suited for the movement of elongated narrow objects such as rockets, cylinders, and the like.

Yet another object of the present invention is to provide in a hand truck of the above type a new and improved automatic brake for stopping said truck.

Yet another object of the present invention is to provide in a truck of the above type an effective "dead man" control means wherein the truck is automatically stopped when the operator loses control thereof.

Still another object of the present invention is to provide in a truck of the above type means for gently setting down an article carried thereby.

Yet another object of the present invention is to provide in a truck of the above type means for collapsing the truck for ease of storage in a confined space.

Another object of the present invention is to provide in a truck of the above type means for adjusting the carrying frame thereof to conform to the articles to be carried thereby.

Still another object of the present invention is to provide a truck of the above type which is light in weight, inexpensive to construct, easy to operate, and affords maximum safety to both the operator and the load.

Other objects and their attendant advantages will become apparent as the following detailed description is read in conjunction with the accompanying drawing wherein:

Fig. 1 is a side elevation of one embodiment of the present invention with a portion of the handle broken away to show a brake control load;

Fig. 2 is a top plan view of the embodiment illustrated in Fig. 1;

Fig. 3 is an enlarged fragmentary detailed view partially in section of the rear load supporting hooks of the embodiment illustrated in Figs. 1 and 2 looking from the rear forward;

Fig. 4 is an enlarged fragmentary detailed vertical section of a rear and forward hook assembly taken on a line substantially corresponding to line 4—4 of Fig. 3;

Fig. 5 is an enlarged detailed cross-section through the brake construction which is employed in the present embodiment;

Fig. 6 is a change position view of the brake of Fig. 5;

Fig. 7 is an enlarged horizontal cross-sectional view taken on a line substantially corresponding to line 7—7 of Fig. 1 illustrating hand operated control means which may be employed with the brake of Figs. 5 and 6;

Fig. 8 is a side elevation of a second embodiment of the present invention;

Fig. 9 is an enlarged cross-sectional view taken on a line substantially corresponding to line 9—9 of Fig. 8 showing a load release tripping mechanism which is employed in the second embodiment illustrated in Fig. 8;

Fig. 10 is a fragmentary change position view of a portion of Fig. 9 showing the tripping mechanism in released position;

Fig. 11 is an enlarged horizontal cross-sectional view taken on a line substantially corresponding to line 11—11 of Fig. 8 and showing hand controlled tripping mechanism means that may be employed to release a load in the device of the second embodiment; and Fig. 12 is a reduced side elevation showing how either embodiment of the present invention may be collapsed for storage.

Considering first the embodiment illustrated in Figs. 1 and 2, it will be noted that it comprises a chassis 20 which includes a rear frame member 21 having elongated side bars 22 interconnected at their upper ends by a handle portion 23 and at intermediate portions by a cross bar 24 suitably secured in place by T fittings 25 fixed to the side bars 22. The lower ends 26 of the side bars 22 are each bifurcated to receive a wheel 28 together with the mating arms of similar wheel yokes 29 of a forward frame member 30. This latter member comprises a pair of spaced side bars 31 interconnected at their tops by a cross member 32 which, in turn, is connected to the cross bar 24 of the rear frame member 21 by a pair of spaced parallel drag links 33.

With reference to Fig. 4 it will be seen that the opposite ends of the drag links are oppositely threaded at 34 and 35 for engagement with similar oppositely threaded studs 36 and 37 which latter are respectively integral with spaced rotatable sleeves 38 for supporting rear hook assemblies 39 on the cross bar 24, and with knuckles 40 pivotally secured to forward hook assemblies 41 mounted on the forward cross member 32. The right and left hand threads of the drag links 33 permit turn-buckle adjustment of the longitudinal spacing between the rear and front hook assemblies 39 and 41, and the pivotal knuckles 40 and rotatable sleeves 38 insure that the drag links remain substantially parallel with the ground when the truck is in the article carrying position of Fig. 1. As indicated in the drawings, the drag links 33 are constructed of two interfitting or telescoping parts 33a and 33b connected together by suitable pins 42 which may be withdrawn to permit adjustment or to allow complete collapse of the truck to the flat position of Fig. 12, thus enabling it to be hung readily on a wall or stowed in confined spaces when not in use.

On the right side of Fig. 4 one of the forward hook assemblies 41 is shown comprising a depending hook portion 43 which is connected by pins 44 to a suitable mating bracket or cap portion 45. To prevent axial movement of the hooks on the cross member 32, the hook portion 43 may depend through slots 46 in suitable webs 47 welded to the corners of the forward frame member 30 substantially as shown.

With reference to Figs. 3 and 4, it will be noted that the aforesaid rotatable sleeves 38 on the cross bar 24 are prevented from moving axially thereon by the provision of suitable pins 48 which pass through said bar and extend above and below slots 49 in the sleeves as shown. The rear hook assemblies 39, which are supported by said sleeves, comprise pairs of spaced plates 50 through which extend pivot pins 51 for supporting hooks 52 which are normally urged to a closed position by springs 53 interconnecting the forward edges of the hooks and forward projections 54 of the sleeves 38. The lower ends of the plates 50 are notched, as at 55, and the bottoms of the hooks are rounded in order that they can be engaged automatically with suitable lifting eyes or lugs on an article when the hooks are brought into contact therewith by downward movement of the truck handle. The hooks are interconnected for synchronous movement by a hook operating bar 56 (Fig. 3) which may be pulled rearwardly, to the position shown in outline in Fig. 4, when lifting eyes on an article are to be disengaged. However, the hooks may be of such size and so disposed with respect to their pivot pins 51 that they cannot be disengaged from said eyes until such time as the load is supported from below, thus preventing the accidental release thereof during carrying operations.

The embodiment of the truck illustrated in Figs. 1 and 2 is provided with a novel brake which is designated generally by the numeral 60. Brake 60, which is clearly shown in Figs. 5 and 6, is simple and compact and is of the automatic-setting variety which is particularly suitable for mounting within the confined spaces permitted by the wheel mounting means of small vehicles such as the truck shown and described. Though the brake of the present invention is described as it would be used on the present truck, it should be understood that it is by no means limited to such use but, where desirable, may be employed in combination with any movable structure.

Since an identical brake is provided for each of the wheels 28 of the truck a description of one brake suffices for both. With reference to Figs. 5 and 6, the brake assembly 60 operates within a sleeve 61 threaded to the interior of the lower end of the rear side bar 22. The sleeve 61 is adjustable toward or away from the wheel 28 for reasons that will become apparent and is retained at its desired position by means of the setscrew 62.

A brake shoe 63, shaped to conform substantially with the contour of the wheel 28 and provided with serrations 63' on the friction surface thereof, has secured to its convex side a stem 64 the outside diameter of which is substantially smaller than the internal diameter of the sleeve 61. The portion of the stem that is adjacent the shoe 63 is provided with a large tapered shoulder 65. The upper end of the brake shoe stem 64 is attached by means of pin 67 to a depending tongue 66' of a plunger 66 slidable within the sleeve 61. The tongue 66' is provided with a transverse slot 68 for receiving the pin 67 in order that the brake shoe stem 64 can move to one side or the other and still remain substantially parallel to the longitudinal axis of the sleeve 61.

The lower end of said sleeve is provided with a tapered seat 69 having substantially the same angle as that of the shoulder 65 on the brake shoe stem 64. A spring 70 is compressed within the sleeve 61 between a threaded adjustable plug 71 and the plunger 66 to normally urge it and the brake shoe 63 toward the wheel 28. Secured to the upper end of a shank 72 of the plunger 66 is a flexible cable 73 which leads up to suitable brake control means in the handle of the truck, one embodiment of which will be hereinafter described in detail.

When the brake shoe 63 is retracted by means of the control means aforesaid, the tapered shoulder 65 on the brake shoe stem 64 centers itself in the tapered seat 69 of the sleeve 61 substantially as shown in Fig. 5. When the brake control means is released, the compressed spring 70 drives the brake shoe into contact with the wheel with enough pressure to cause it to move with the wheel in the direction of rotation thereof. The brake shoe stem, of course, moves with said brake shoe wedging the tapered shoulder 65 beneath the tapered seat 69 of the sleeve 61, as in Fig. 6, to force the brake shoe 63 tightly against the wheel thereby stopping the truck. The brake is readily released by actuating the hand control means while moving the truck slightly in the opposite direction to cause the wheel thereof to move the shoulder 65 from beneath the seat 69 of the sleeve.

To increase the compression of spring 70, a suitable spanner tool may be inserted through the opening 74 in the wall of side bar 22 and engaged with the spanner receiving recesses 75 in the top of the adjusting plug 71. As the wheel and/or brake shoe 63 becomes worn, the sleeve 61 may be screwed outwardly toward the wheel to move the tapered seat 69 to a position where the proper wedging action will be obtained therewith by the tapered shoulder 65 on the brake shoe stem 64.

It will be apparent that the brake of the present invention will be equally effective irrespective of the direction of motion of the vehicle with which it is used. Furthermore, the efficiency of the brake will be substantially constant irrespective of the vehicle's speed or momentum, since an increase in either will drive the tapered shoulder 65 further beneath the seat 69 thereby increasing the pressure exerted by brake shoe 63 on the wheel 28.

One means for controlling the brake mechanism 60 is illustrated in Fig. 7 and with reference thereto the brake control comprises a pair of hand grip levers 80 and 81 pivoted near their inner ends on pins 82 mounted on a suitable bracket 83 secured in the handle of the truck. The brake operating cables 73, which are connected at one end of the shank 72 of plunger 66 of the brake as aforesaid, extend through suitable guide tubing 84 in the sides of the frame 20 and are secured to the hand levers 80 and 81 on the inner sides of the pivots thereof by any suitable means such as the conventional threaded cable sockets 85 shown. The hand grip levers are interlocked for synchronous movement by the provision of pin 86 on the end of one, which is engageable by a fork portion 87 on the end of the other substantially as shown. It will be observed that the inner rear ends of the hand grip levers are provided with rearward projections 88 around which the cable 73 passes. The projections 88 are of suitable size to provide the necessary leverage for releasing the brakes of the truck when said levers are squeezed by the hands of an operator.

Since the brakes are normally biased to set position by the compressed spring 70 thereof, it will be apparent that an operator must maintain pressure on the hand grip levers at all times while moving the truck, since any relaxation thereon will result in immediate automatic setting of the brakes. Thus, an effective "dead man" control of the truck is achieved which makes it particularly useful for the transportation of explosive missiles such as rockets or the like.

A truck having a rigid frame construction as above-described has certain disadvantages in that an operator must manipulate the handle of the truck to place one end of an article on the ground before disengaging one set of hooks and then to ease the other end of the article to the ground before disengaging the other set of hooks. With heavy articles this is sometimes dangerous because of the possibility of the operator's losing control of the handle and dropping the article with possible damage to it and injury to himself.

To obviate this danger, the truck as hereinbefore described may be suitably modified, as illustrated in Figs. 8, 9, and 11, to enable partial collapsing thereof to set down a load without any movement of the handle on the part of the operator. This is accomplished by supporting the cross bar 24 on slidable sleeves 90 rather than on the fixed sleeves 25 shown in Figs. 1 thru 4. A tripping mechanism 91, best shown in Figs. 9 and 10 and described in detail below, is provided for supporting the cross bar 24 until such time as hand control means (Fig. 11) in the truck handle is actuated to release the tripping means, whereupon, as shown in outline in Fig. 8, the sleeves 90 slide down the sides of the frame member 20 rotating the forward frame 30 about the wheels 28 until the article rests upon the ground still engaged by the hooks of the truck. It is then a simple matter for the operator to disengage, in turn, the rear and forward hooks from the article. As the sleeves 90 slide downwardly they compress relatively light coil springs 92 which are mounted atop suitable collars 93 fixed about the rear side bar 22. Springs 92 serve to return the parts of the truck to load-carrying position after the article has been released.

Referring now to Figs. 9 and 10 one form of tripping mechanism comprises a pawl 94 rotatably mounted on a pivot pin 95 secured in a suitable housing 96 fixed within the side bars 22. The pawl 94 extends through a suitable slot in the bar 22 to engage the interior of the cross bar stud 24' where it joins with the sleeves 90 to provide support therefor when the tripping mechanism is in the position of Fig. 9.

A toggle link 97 interconnects the opposite side of pawl 94 with a second rotatable member 98 pivoted on a pin 99 mounted in the housing 96. A cable 100 secured to the member 98 passes therearound and leads upwardly to the aforesaid hand control means in the handle of the truck. When the toggle 97 is in the set position of Fig. 9, the knee of the toggle lies slightly below center so that a slight clockwise bias is exerted on rotatable member 98 by the weight of the load, tending to move the mechanism to the tripped position of Fig. 10.

The purpose of the control means in the handle of the truck is to provide means for retaining the tripping mechanism in load supporting position. With reference to Fig. 11, the control means comprises a pair of hand grip levers 101 and 102 pivoted on suitable pins 103 mounted on a bracket 104 secured in the handle of the truck. The hand levers are interlocked for synchronous movement by mounting a pin 105 on one which is engagable by a forked portion 106 on the other. The hand grip levers 101 and 102 in the retracted position of Fig. 11 engage rotatable cable clamp members 107 which have secured thereto in the manner illustrated the opposite ends of the cables 100. When a load is supported on the rear hooks 39 and a clockwise bias is thereby exerted on the rotatable member 98 as aforesaid, the cable clamp members are urged in the direction of the arrows 108, but will be prevented from doing so by the retracted hand levers 101 and 102. However, the instant that the operator releases his grip thereon, the cable clamp members 107 move outwardly and the tripping mechanism moves to the position of Fig. 10 releasing sleeves 90 to enable the truck partially to collapse as indicated in Fig. 8.

In order that the article will not be set down with damaging impact a pneumatic piston assembly 110 may be provided in the side bars 22. The piston thereof may be provided with an elongated piston rod 112 having a head portion 113 of the shape shown to extend through a suitable slot 114 in the side of the bars 22. The head portion 113 may engage the slidable sleeve 90 in the manner indicated and the bottom of the head portion 113 may be engaged by the coil spring 92 in order that the piston and sleeve 90 are returned simultaneously to the load supporting position of Fig. 9. Buffing, of course, is provided, upon descent of the sleeve 90, by the restricted escape of air through suitable apertures 115 in the base of the pneumatic cylinder.

After the article has been disengaged from the hooks of the truck, the tripping mechanism may be moved automatically to the reset position by providing a toe 98' which may project into the path of the sleeve 90 when the release mechanism is in the tripped position of Fig. 10. The toe 98' is struck with sufficient force by the top of the sleeve 90, upon its return by the coil spring 92, that the tripping mechanism is returned to the position of Fig. 9 where it can be retained by pressure on the hand levers 101 and 102 in the manner aforesaid.

It should be understood that with the above-described means for lowering an article an effective "dead man" control of the truck is achieved in that the load is immediately and automatically deposited on the ground should an operator momentarily lose control of the truck. Since the frictional contact of the article with the ground should be sufficient to stop it and the truck with but slight forward motion, the hereinbefore described brakes may be dispensed with. However, it should be understood that said brakes may readily be used in conjunction with the article lowering means and such use is contemplated within the purview of the invention.

The truck is operated as follows:

With particular reference to Figs. 1 and 2, an article, such as the crate 120 shown, is first provided with suitable lifting means such as slings of the necessary length or suitable lugs such as those indicated by the numerals 121 and 122. The lugs, of course, are spaced longitudinally and laterally about the article's center of gravity a distance substantially equal to the spacing between the hooks of the truck but substantially closer to the ground than said hooks when the truck is in the article carrying position of Fig. 1.

When the article is to be picked up, the truck is rolled to a position straddling the article and the longitudinal spacing between the front and rear hooks 41 and 39 are adjusted as necessary by rotation of the drag links 33. The operator engages the forward lugs 122 of the article with the forward hooks 41 by raising the handle of the truck a sufficient distance. He thereupon utilizes the handle of the truck as a lever and exerts a downward force thereon thereby raising the forward portion of the article and bringing the rear hooks 39 into engagement with the rear lugs 121. The operator now raises the handle of the truck to the substantially horizontal position of Fig. 1 to lift the article from the ground in readiness to be transported to the desired destination. The operator, of course, retains the grip levers in the handle of the truck in a retracted position. (It should be understood that the article is engaged in this manner irrespective of whether the rigid or collapsible frame truck is utilized.)

Upon arrival at the destination with the rigid frame truck, the operator releases the hand grip levers 80 and 81 to set the brakes 60. He then moves the handle of the truck downwardly until the rear of the article is resting on the ground, whereupon the operator leans over the handle to disengage the rear hooks 39 by actuating the release bar 56. The handle of the truck is then eased upwardly until the forward portion of the article is resting on the ground at which time the forward hooks 41 are readily disengaged from the forward lugs 122 by rearward movement of the truck.

To deposit the article from the collapsible frame truck of Fig. 8, the operator merely releases the hand grip levers 101 and 102 permitting the tripping mechanism to move to tripped position of Fig. 10 and the truck partially to collapse until the article is resting on the ground still engaged by the hooks of the truck which are thereupon disconnected from the lugs in the manner above-described.

It should be understood that since the handle of the truck is essentially a wheeled lever it may be of whatever length is necessary to give an operator of average size the required mechanical advantage to lift articles several times his weight with minimum effort. Furthermore, it will be readily apparent that the truck of the present invention may be constructed with many variations and modifications without departing from the scope and spirit of the appended claims.

The invention described herein may be manufactured and used by or for the Government of the United States of America for governmental purposes without the payment of any royalties thereon or therefor.

What is claimed is:

1. A hand truck comprising a rear frame having spaced sides and an open end, a forward frame member having spaced sides and an open end, means for pivotally joining the open ends of said frame members, separately mounted wheels positioned at the joined ends of said frame members, a handle portion on the rear frame member, horizontal linkage means interconnecting said frame members at a spaced distance from said joined ends, a relatively stationary hook carried by and depending from the forward frame member, a movable hook connected to and depending from said rear frame member, rear and forward hook receiving means disposed on opposite sides of the center of gravity of an article to be carried and at a spaced distance from each other and below said hooks, said horizontal linkage being adjustable to alter the relative positions of the frame members and the spacing between said stationary hook and said movable hook to correspond to the spacing between the rear and forward hook receiving means on said article, said article being picked up when said truck is rolled to a position straddling said article and the handle of said truck is raised to engage the forward hooks with the forward hook receiving means of said article and then pushed downwardly to raise the forward portion of the article and engage said rear hooks with said rear hook receiving means of said article whereupon said article is suspended in said truck when said handle is moved upwardly to an article carrying position.

2. A hand truck comprising; a frame having forward and rear members pivotally connected to one another at one end thereof and having spaced vertical sides of a size enabling said frame to straddle an article, a wheel on each of said sides, an elongated handle portion integral with said frame, article engaging means on said forward member in front of said wheels, second article engaging means on said rear member behind said wheels, said vertical sides including an adjustable linkage for altering the relative positions of said forward and rear members and the spacing between said first and second article engaging means to correspond to spacing between lifting means on said article to enable the same to be engaged by the article engaging means on said frame upon vertical movement of said handle said linkage being connected between the forward and rear members of the frame.

3. A two wheeled truck comprising a collapsible carrying frame including spaced sides enabling said truck to straddle an article, an elongated handle integral with said frame, means for suspending an article from said frame between the sides thereof, releasable supporting means for retaining the frame in article carrying position, hand operated means for releasing said supporting means to enable the weight of said article to collapse said frame and lower said article to the ground, and resilient means for returning said frame to its first position when an article is disengaged from said truck.

4. A hand truck comprising; a frame having forward and rear members pivotally connected to one another at one end thereof and having spaced vertical sides of a size enabling said frame to straddle an article, a wheel on each of said sides, an elongated handle integral with said frame, spaced article engaging means on said frame for engaging and lifting an article upon vertical movement of the handle of said truck, said vertical sides including an adjustable linkage for altering the relative positions of said forward and rear members and the spacing between said article engaging members to correspond with the size of said article said linkage being connected between the forward and rear members of the frame.

5. A wheeled truck comprising a frame having forward and rear members pivotally connected to one another at one end thereof for swinging movement about a horizontal axis and having spaced sides for straddling an article, an elongated handle integral with said frame, longitudinally spaced means on said frame for engaging and lifting an article upon vertical movement of said handle, releasable supporting means for retaining said frame in article carrying position, said releasable supporting means including a slidably mounted sleeve carried by said frame and connected to said means for engaging and lifting an article, hand control means operable to trip said supporting means to enable said truck to be partially collapsed by the weight of the article carried thereby while maintaining the spacing between the means for engaging and lifting an article, and damping means in said frame to retard the speed with which said frame collapses.

6. A collapsible two wheeled truck comprising a frame of a size enabling the truck to straddle an article, an elongated rigid handle connected to said frame, article engaging means on said truck disposed in front of and behind said wheels at a height greater than said article, said article being engaged and lifted by said article engaging means upon vertical movement of said handle about said wheels, releasable tripping means for retaining said frame in article carrying position, said last named means comprising a pawl pivoted in one portion of the frame and engaging another portion of the frame movable with respect to the first portion, a rotatable member pivoted in said first portion, a toggle link interconnecting said pawl and said rotatable member, manually operated means for rotating said last named member to move said toggle link to tripped position thereby enabling the weight of said article to collapse said frame, and damping means between two relatively movable portions of said frame for retarding the collapse thereof.

7. A hand truck comprising a rear frame having spaced sides and an open end, a forward frame member having spaced sides and an open end, means for pivotally joining the open ends of said frame members, separately mounted wheels positioned at the joined ends of said frame members, a handle portion on the rear frame member, a relatively stationary hook depending from the forward frame member, a movable hook depending from said rear frame member, rear and forward hook receiving means disposed on opposite sides of the center of gravity of an article to be carried and at a spaced distance from each other but below said hooks, horizontal linkage means interconnecting said forward and rear frame members, said horizontal linkage being adjustable to alter the relative positions of said frame members and the spacing between said stationary hook and said movable hook to correspond to the spacing between the rear and forward hook receiving means on said article, said article being picked up when said truck is rolled to a position straddling said article and the handle of said truck is raised to engage the forward hooks with the forward hook receiving means of said article and then pushed downwardly to raise the forward portion of the article and engage said rear hooks with said rear hook receiving means of said article whereupon said article is suspended in said truck when said handle is moved upwardly to an article carrying position.

8. A wheeled truck comprising a rear frame member, a forward frame member having one end pivotally attached to one end of said rear frame member, a handle portion on said rear frame member, a first hook depending from said forward frame member, a second hook depending from said rear frame member, rear and forward hook receiving means disposed on opposite sides of the center of gravity of an article to be carried and at a spaced distance from each other below said hooks, horizontal linkage means interconnecting said rear and forward frame members, said horizontal linkage including a pair of adjustable telescoping members which may be slidably moved with respect to each other to alter the spacing between said first and second hooks to correspond to the spacing between the rear and forward hook receiving means on said article, and means for locking said horizontal linkage in any adjusted position, said hooks being engaged with said hook receiving means to lift said article when said hooks are lowered into engaging position by vertical movement of said handle.

9. A truck as defined in claim 8 and further including a hollow sleeve in the frame and having one end in close proximity to the periphery of a wheel, a brake shoe, a stem rigidly secured to said brake shoe and movable within said sleeve, means connected to said stem for moving said brake shoe into and out of contact with said wheel, a tapered shoulder on said stem, a tapered seat on said sleeve engageable by said tapered shoulder, said shoe being movable with said wheel when in contact therewith to move said tapered shoulder beneath said tapered seat thereby driving said shoe tightly against said wheel to brake the same.

10. A truck as defined in claim 8 and further comprising a brake mechanism including a hollow sleeve having one end in close proximity to the wheel of said truck, a brake shoe, a stem rigidly secured to said brake shoe and movable within said sleeve, a lever in the handle of said truck connected to said stem for moving said brake shoe into and out of contact with said wheel, a tapered shoulder on said stem, a tapered seat on said sleeve engageable by said tapered shoulder, said shoe being movable with said wheel when in contact therewith to move said tapered shoulder beneath the tapered seat thereby driving the shoe tightly against the wheel to brake the truck.

11. A hand truck as defined in claim 8 and further including a brake mechanism comprising a relatively stationary hollow sleeve mounted on said truck frame and having one end in close proximity to the periphery of a wheel of said truck, a brake shoe, a stem rigidly secured to said brake shoe and movable within said sleeve, resilient means normally urging said brake shoe toward said wheel, a lever in the handle of said truck connected to said stem for moving the brake shoe out of contact with the wheel, a tapered shoulder on said stem, a tapered seat on said sleeve engageable by said tapered shoulder, said shoe being movable with said wheel when in contact therewith to move the tapered shoulder beneath the seat thereby automatically setting the brakes upon release of the lever in the handle of the truck.

JOSEPH H. PROWINSKY.
DAVID J. CARLSON.

References Cited in the file of this patent

UNITED STATES PATENTS

| Number | Name | Date |
|---|---|---|
| 206,152 | Thomas | July 16, 1878 |
| 375,911 | Aber | Jan. 3, 1888 |
| 1,649,940 | Willmot | Nov. 22, 1927 |
| 2,019,256 | Dutton | Oct. 29, 1935 |
| 2,079,719 | Schuetze | May 11, 1937 |
| 2,338,645 | James | Jan. 4, 1944 |
| 2,362,749 | Gall et al. | Nov. 14, 1944 |
| 2,444,690 | Almendinger et al. | July 6, 1948 |
| 2,576,048 | Schum | Nov. 20, 1951 |

FOREIGN PATENTS

| Number | Country | Date |
|---|---|---|
| 410,287 | Germany | Mar. 2, 1925 |
| 893,555 | France | Feb. 7, 1944 |